(12) United States Patent
Kang et al.

(10) Patent No.: US 10,103,800 B2
(45) Date of Patent: Oct. 16, 2018

(54) METHOD AND APPARATUS FOR ADAPTIVE BEAM HOPPING IN MULTI CELL MULTI USER COMMUNICATION SYSTEM

(71) Applicants: Samsung Electronics Co., Ltd, Gyeonggi-do (KR); Korea Advanced Institute of Science and Technology, Daejeon (KR)

(72) Inventors: Myung-Gil Kang, Daejeon (KR); Wan Choi, Daejeon (KR); Dae-Kyu Shin, Daejeon (KR); Sang-Wook Suh, Yongin-si (KR)

(73) Assignees: Samsung Electronics Co., Ltd, Suwon-si (KR); Korea Advanced Institute of Science and Technology, Daejeon (KR)

( * ) Notice: Subject to any disclaimer, the term of this patent is extended or adjusted under 35 U.S.C. 154(b) by 632 days.

(21) Appl. No.: 14/842,636

(22) Filed: Sep. 1, 2015

(65) Prior Publication Data

US 2016/0065294 A1 Mar. 3, 2016

(30) Foreign Application Priority Data

Aug. 29, 2014 (KR) ........................ 10-2014-0113970

(51) Int. Cl.
*H04B 7/06* (2006.01)
*H04W 16/28* (2009.01)
(Continued)

(52) U.S. Cl.
CPC ........... *H04B 7/0695* (2013.01); *H04B 7/022* (2013.01); *H04B 7/0408* (2013.01); *H04B 7/0617* (2013.01); *H04W 16/28* (2013.01)

(58) Field of Classification Search
CPC .... H04B 7/022; H04B 7/0408; H04B 7/0617; H04B 7/0695; H04W 16/28
(Continued)

(56) References Cited

U.S. PATENT DOCUMENTS 6,522,643 B1 *  2/2003  Jacomb-Hood .... H04B 7/18539
                                                     370/330
6,973,089 B1 * 12/2005  Linsky ............... H04B 7/18515
                                                     370/310.2
(Continued)

FOREIGN PATENT DOCUMENTS

KR          20070103703 A        10/2007

OTHER PUBLICATIONS

T.S. Rappaport, et al.; "State of the Art in 60 GHz Integrated Circuits and Systems for Wireless Communications"; Proceedings of the IEEE (invited), vol. 99, No. 8; Aug. 2011; pp. 1390-1436.
(Continued)

*Primary Examiner* — Stephen J Clawson

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are a method and an apparatus for performing adaptive beam hopping in a multi-cell multi-user communication system. The method includes: making a request for allowing multiple accesses for beam hopping for a predetermined operation time to a plurality of accessible base stations (BSs); receiving a response to the request from two or more BSs among the plurality of BSs and determin-
(Continued)

ing, according to a predetermined reference, beams above the reference among transmission beams of the two or more BSs as available beams; determining a beam hopping pattern based on the determined available beams and transmitting the determined hopping pattern to the two or more BSs; and forming reception beams based on the determined beam hopping pattern to receive signals.

20 Claims, 7 Drawing Sheets

(51) Int. Cl.
  *H04B 7/0408* (2017.01)
  *H04B 7/022* (2017.01)
(58) Field of Classification Search
  USPC .......................................................... 370/334
  See application file for complete search history.

(56) References Cited

U.S. PATENT DOCUMENTS

| | | | | |
|---|---|---|---|---|
| 6,980,832 | B1* | 12/2005 | Ylitalo | H04B 7/022 455/12.1 |
| 9,578,644 | B2* | 2/2017 | Yu | H04L 5/0057 |
| 9,866,300 | B2* | 1/2018 | Chang | H04B 7/0617 |
| 9,954,601 | B2* | 4/2018 | Buer | H04B 7/18513 |
| 2008/0146238 | A1* | 6/2008 | Saito | H04B 7/0491 455/442 |
| 2008/0311944 | A1* | 12/2008 | Hansen | G01S 1/02 455/517 |
| 2012/0307870 | A1* | 12/2012 | Hakola | H04B 1/713 375/135 |
| 2013/0039285 | A1* | 2/2013 | Sorrentino | H04L 5/0091 370/329 |
| 2013/0114570 | A1* | 5/2013 | Park | H04L 5/0053 370/335 |
| 2015/0256403 | A1* | 9/2015 | Li | H04W 4/70 370/235 |
| 2016/0156409 | A1* | 6/2016 | Chang | H04W 4/90 370/315 |
| 2016/0249198 | A1* | 8/2016 | Kim | H04W 48/16 |
| 2016/0381672 | A1* | 12/2016 | Kim | H04W 72/048 370/329 |
| 2017/0347268 | A1* | 11/2017 | Chen | H04W 16/02 |
| 2018/0123897 | A1* | 5/2018 | Lee | H04L 41/12 |

OTHER PUBLICATIONS

S. Singh, et al.; "Millimeter wave WPAN: cross-layer modeling and multi-hop architecture"; Proceedings of INFOCOM 2007; IEEE, Anchorage, Alaska, US; pp. 2336-2240.

O. E. Ayach, et al.; "Spatially Sparse Precoding in Millimeter Wave MIMO Systems"; ArXiv:1305.2460; May 11, 2013; 30 pages.

J. Brady, et al.; "Beamspace MIMO for millimeter-wave communications: system architecture, modeling, analysis, and measurements"; IEEE Trans. Antennas and propagation, vol. 61, No. 7; Jul. 2013; pp. 3814-3827.

K. Ramachandran, et al.; "Adaptive Beamforming for 60 GHz Radios: Challenges and Preliminary Solutions"; Proceedings of the 2010 ACM international workshop on mmWave communications; Sep. 24, 2010; pp. 33-37.

S. Rangan, T. S. Rapparport; "Millimeter wave cellular wireless networks: potentials and challenges"; ArXiv:1401.2560v1; Jan. 11, 2014; 17 pages.

E. Torkildson, B. Ananthasubramaniam, U. Madhow, M. Rodwell; "Millimeter-wave MIMO: wireless at optical speeds"; Proceedings of Allerton; NSF under grants ECS-0636621; 2006; 9 pages.

T. Bai and R. W. Heath Jr; "Coverage and rate Analysis for millimeter wave cellular networks"; arXiv:1402.6430v3 [cs.IT]; Oct. 18, 2014; 16 pages.

Cunsheng Ding, et al.; "Sets of Frequency Hopping Sequences: Bounds and Optimal Constructions"; IEEE Transaction on Information Theory; vol. 55. No. 7; Jul. 2009; pp. 3297-3304.

S. Visuri, H. Bolcskei; "Multiple-Access Strategies for Frequency-Selective MIMO Channels"; Transaction on Information Theory; vol. 52. No. 9; Sep. 2006; pp. 3980-3993.

S. Kittipiyakul, T. Javidi; "Optimal operating point for MIMO multiple access channel with bursty traffic"; IEEE Transaction on Wireless Communications; vol. 6. No. 12; Dec. 2007; pp. 4464-4474.

Z. Kostic, I. Maric; "Dynamic frequency hopping in wireless cellular systems-simulations of full-replacement and reduced-overhead methods"; Wireless Systems Research—AT&T Labs and WINLAB—Rutgers University; IEEE; 1999; pp. 914-918.

* cited by examiner

METHOD AND APPARATUS FOR ADAPTIVE BEAM HOPPING IN MULTI CELL MULTI USER COMMUNICATION SYSTEM

CROSS-REFERENCE TO RELATED APPLICATION(S) AND CLAIM OF PRIORITY

This application claims priority under 35 U.S.C. § 119(a) to Korean Application Serial No. 10-2014-0113970, which was filed in the Korean Intellectual Property Office on Aug. 29, 2014, the entire content of which is hereby incorporated by reference.

TECHNICAL FIELD

The present disclosure relates to an apparatus and a method for beam hopping between multiple transmission/reception beams and forming and using reception beams in a multi-cell communication system.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, a communication system has a multi-cell structure, and the configuration and use of transmission/reception beams in a multi-cell communication system act as important factors that influence an overall system capability of the multi-cell communication system.

In the multi-cell communication system, a multi-Base Station (BS) access model, in which a plurality of User Equipments (UEs) sequentially or simultaneously receive services from a plurality of base stations according to a movement speed or communication quality, is considered to provide a seamless service and high quality communication to each UE. However, a communication method of the UE through a multi-beam service of multiple BSs has not been researched in earnest, and most conventional technologies used frequency resources and time resources instead of efficiently using transmission/reception beams or simply concentrated on performance improvement through simultaneous services of multiple BSs. When the BS determines whether to allow multiple accesses based on the use of transmission beams, the range of adjacent BSs with which each BS shares information on whether to use the beams is not clear, and, in order to use the transmission beams, information should be updated between all adjacent BSs whenever a change in the UE is made. Representative methods of the technologies for the conventional multi-BS multi-user service include a multi-access channel and a frequency hopping scheme.

FIG. 1 schematically illustrates a multi-access channel scheme used in a general multi-cell communication system.

Referring to FIG. 1, the multi-access channel scheme includes a plurality of Base Stations (BSs) (two BSs 111 and 113 are illustrated in FIG. 1) and one UE 115. A multi-access channel corresponds to a model in which a plurality of BSs simultaneously access one UE, and FIG. 1 is only an example and the multi-access channel is applied to two or more BSs and a UE.

In FIG. 1, when BS #1 111 and BS #2 113 configure transmission beam #1 117 and transmission beam #2 119, respectively, and simultaneously transmit the transmission beams to UE #1 115, UE #1 115 configures reception beams of various directions and forms according to directions and forms of the transmission beams. FIG. 1 illustrates four types of reception beams, that is, reception beam #1 121, reception beam #2 123, reception beam #3 125, and reception beam #4 127 as an example of the reception beams configured by UE #1 115.

The multi-access channel has a problem that the UE 115 should alternately use reception beam #1 121, reception beam #2 123, reception beam #3 125, and reception beam #4 127 according to time and thus form different reception beams according to time or frequency resources as illustrated in an example of FIG. 1. Further, since the form of a reception beam which can be formed has a limitation due to a physical limit of the UE 115, the number of BSs that can simultaneously provide services to the UE 115 is limited compared to the number of BSs which can actually provide the services. In addition, transmission beam information of BSs that access the UE 115 should be shared with the UE 115 every time, and the UE 115 should inform all neighboring BSs every time of information on reception beams formed based on the transmission beam information and whether to maintain the multi-access channel with the corresponding BSs.

FIG. 2 illustrates an example of a frequency hopping scheme used in the general multi-cell communication system.

The frequency hopping scheme corresponds to a scheme that uses the whole frequency in predetermined divided time intervals. Since one frequency resource is used only for a predetermined time and another frequency resource is used for another predetermined time in the frequency hopping, it is possible to reduce influence of interference from an interferer that uses the same frequency resource. However, the whole frequency band allocated to the UE cannot be used at the same time, thereby deteriorating the performance. Further, since a new beam should be formed according to each frequency resource, pieces of transmission and reception beam information, which should be shared between all neighboring BSs and all UEs, become larger as the frequency hopping is implemented through a plurality of frequency resources.

Particularly, in a communication model using a high frequency bandwidth, which is currently spotlighted as a next generation communication model, a scattering effect of reception signals to be used for communication becomes weak according to a movement of the UE or a regional characteristic. However, the frequency hopping scheme cannot solve the problem of the weakness of the scattering effect, but rather worsens the problem, so it is difficult to apply the frequency hopping scheme to the next generation mobile communication model.

Since BSs for a multi-access service is limited according to a physical limitation in forming reception beams and an amount of information exchanged between the BS and the UE is large in a communication model using a multi-access channel scheme and a high frequency bandwidth, it is not possible to provide a service having stable performance which the UE desires to acquire.

SUMMARY

A recent communication environment as well as a communication module using a high frequency bandwidth become more complex day by day, and beam forming techniques suitable for various Base Station (BS) environments and service methods are considered. Accordingly, in order to prevent deterioration of performance of User Equipments (UEs), the proper use of transmission/reception beams is more important than ever. Therefore, a method of efficiently using multiple transmission beams between multiple cells to reduce interference due to the use of the same frequency, which frequently happens, to reduce an amount of information to be shared between the BS and the UE, and to achieve the performance desired by the UE is now required.

Various embodiments of the present disclosure provide a method and an apparatus for determining available transmission beams to use a plurality of transmission beams in a multi-cell communication system.

Various embodiments of the present disclosure provide a method and an apparatus for performing transmission beam hopping to use a plurality of transmission beams in a multi-cell communication system.

Various embodiments of the present disclosure provide a method and an apparatus for initializing transmission beam hopping to use a plurality of transmission beams in a multi-cell communication system.

Various embodiments of the present disclosure provide a method and an apparatus for performing transmission to use a plurality of transmission beams in a multi-cell communication system.

Various embodiments of the present disclosure provide a method and an apparatus for forming reception beams according to hopping of a plurality of transmission beams in a multi-cell communication system.

In accordance with an aspect of the present disclosure, a method of performing adaptive beam hopping in a multi-cell multi-user communication system is provided. The method includes: making a request for allowing multiple accesses for beam hopping for a predetermined operation time to a plurality of accessible base stations (BSs); receiving a response to the request from two or more BSs among the plurality of BSs and determining, according to a predetermined reference, beams above the reference among transmission beams of the two or more BSs as available beams; determining a beam hopping pattern based on the determined available beams and transmitting the determined beam hopping pattern to the two or more BSs; and forming reception beams based on the determined beam hopping pattern to receive signals.

In accordance with another aspect of the present disclosure, a method of performing adaptive beam hopping in a multi-cell multi-user communication system is provided. The method includes: receiving a request for allowing multiple accesses for beam hopping for a predetermined operation time from a user equipment (UE) by a base station (BS); determining whether to allow the multiple accesses of the UE and transmitting a result of the determination to the UE; receiving a beam hopping pattern from the UE; and forming a transmission beam based on the received beam hopping pattern and transmitting a signal.

In accordance with another aspect of the present disclosure, an apparatus for performing adaptive beam hopping in a multi-cell multi-user communication system is provided. The apparatus includes: a transceiver configured to transmit and receive signals to and from one or more base stations (BSs); and a controller configured to make a request for allowing multiple accesses for beam hopping for a predetermined operation time to a plurality of accessible BSs, receive a response to the request from two or more of the plurality of BSs, determine, as available beams, beams exceeding a predetermined reference among transmission beams of the two or more BSs, determine a beam hopping pattern based on the determined available beams, transmit the determined beam hopping pattern to the two or more BSs, and to form a reception beam based on the determined beam hopping pattern to receive a signal.

In accordance with another aspect of the present disclosure, an apparatus for performing adaptive beam hopping in a multi-cell multi-user communication system is provided. The apparatus includes: a transceiver configured to transmit and receive signals to and from a plurality of user equipments (UEs); and a controller configured to receive a request for allowing multiples accesses for beam hopping for a predetermined operation time from the UE, determine whether to allow the multiple accesses of the UE, transmit a result of the determination to the UE, receive a beam hopping pattern from the UE, and form a transmission beam based on the received beam hopping pattern to transmit a signal.

According to various embodiments of the present disclosure, it is possible to efficiently use multiple transmission beams in a multi-cell communication system.

According to various embodiments of the present disclosure, it is possible to reduce performance deterioration due to interference in a multi-cell communication system.

According to various embodiments of the present disclosure, it is possible to use constant reception beams while using multiple transmission beams in a multi-cell communication system.

According to various embodiments of the present disclosure, it is possible to easily cancel the use of a new transmission beam or the existing transmission beam when transmission/reception beams are controlled in a multi-cell communication system.

According to various embodiments of the present disclosure, it is possible to reduce an amount of information to be shared between the BS and the UE when transmission/reception beams are controlled in a multi-cell communication system.

According to various embodiments of the present disclosure, it is possible to easily secure various radio channels compared to a case where a plurality of UEs use a single transmission beam in a multi-cell communication system.

According to various embodiments of the present disclosure, it is possible to effectively improve problems corresponding to an increase in information sharing between a plurality of BSs and UEs since the form of the reception beam changes over time according to the use of a plurality of transmission beams or the necessity of information sharing between a plurality of adjacent BSs and UEs when a characteristic of the UE changes according to the movement of the UE or whether a service is possible.

According to various embodiments of the present disclosure, it is possible to increase availability of a radio channel characteristic by using all frequency resources and, accordingly, to reduce the influence of interference, which is generated between multiple UEs while servicing the UE with the improved performance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 schematically illustrates an operation in which the UE determines a beam use pattern according to various embodiments of the present disclosure;

FIG. 6 schematically illustrates an operation in which the UE initializes a beam use pattern according to various embodiments of the present disclosure;

DETAILED DESCRIPTION

Figure 1:
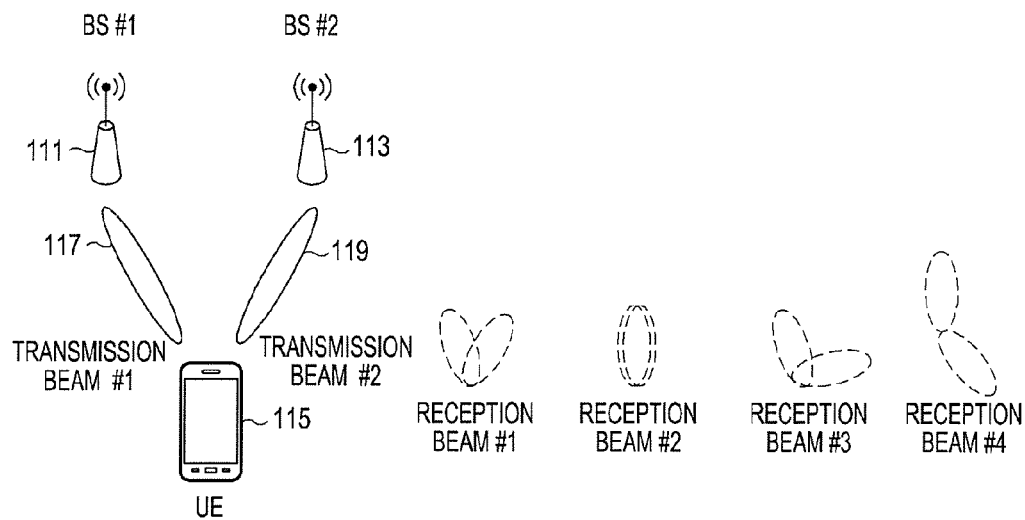
FIG. 1 schematically illustrates a multi-access channel used in a general multi-cell communication system according to various embodiments of the present disclosure.
Figure 2:
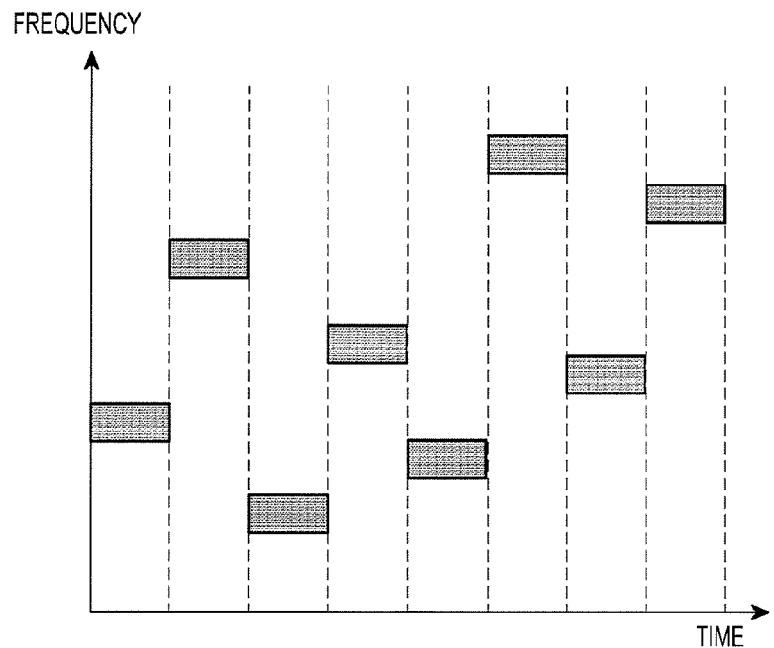
FIG. 2 schematically illustrates frequency hopping used in a general multi-cell communication system according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Hereinafter, exemplary embodiments according to the present disclosure will be described in detail with reference to the accompanying drawings. In the following description, it should be noted that only portions required for comprehension of operations according to the embodiments of the present disclosure will be described and descriptions of other portions will be omitted not to make subject matters of the present disclosure obscure.

The present disclosure may have various modifications and embodiments and thus will be described in detail by exemplifying specific embodiments through drawings. However, it should be understood that the present disclosure is not limited to the specific embodiments, but the present disclosure includes all modifications, equivalents, and alternatives within the spirit and the scope of the present disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

In the present disclosure, the terms are used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

Various embodiments of the present disclosure suggests a method and an apparatus for hopping between multiple transmission beams and forming reception beams in a multi-BS multi-user communication system.

Hereinafter, although it is assumed that a signal transmitting device is a Base Station (BS) and a signal receiving device is a User Equipment (UE) in embodiments of the present disclosure for the convenience of description, the present disclosure is not limited thereto and it is apparent to those skilled in the art that the present disclosure can be applied to another type of the signal transmitting device and the signal receiving device.

The method of hopping between transmission beams and forming reception beams suggested by the present disclosure can be applied to various multi-cell communication systems such as a Long Term Evolution (LTE) communication system, a Long Term Evolution Advanced (LTE-A) communication system, a High Speed Downlink Packet Access (HSDPA) communication system, a high Speed Uplink Packet Access (HSUPA) communication system, a High Rate Packet Data (HRPD) communication system of 3rd Generation Project Partnership 2 (3GPP2), a Wideband Code Division Multiple Access (WCDMA) communication system of 3GPP2, a Code Division Multiple Access (CDMA) communication system of 3GPP2, and an Institute of Electrical and Electronics Engineers (IEEE) 802.16m communication system.

Multi-access schemes, which are implemented and considered in a current communication system, are performed based on an operation in which BS s almost simultaneously provide services to a UE or provide services to a UE by sequentially using some of time or frequency resources, and a hopping scheme between multiple beams that considers the sequential use of multiple transmission beams has not been yet researched. The beam hopping that determines whether to use multiple transmission beams randomly or according to a particular rule with respect to a predetermined transmission time reduce a sharing amount of information between the BS and the UE, reduce an influence of interference between BSs, which is generated due to the use of the same frequency resource, and uniformly maintain the form of reception beams while using all bandwidths allocated to the UE every time, so that the necessity and importance of a transmission beam hopping method is very large. Particularly, under a situation in which a directivity beam-based communication structure using a high frequency band is researched as a standard model of a 5th generation communication environment after the fourth generation LTE, the need for a multi-transmission beam use method, which effectively increase availability between transmission beams, maintain the form of reception beams, secure stable multiple radio channels, and maintain stable services from multiple BSs is great.

Accordingly, various embodiments of the present disclosure provides a multi-transmission beam hopping method for efficiently using multiple transmission beams which can be used in a multi-cell communication system having a complex structure. The multi-transmission beam hopping method provided by various embodiments of the present disclosure can solve the frequency bandwidth availability deterioration problem, the multi-access BS limit problem, and the problem of excessive information sharing between the BS and the UE, which are generated in the conventional multi-access methods.

Figure 3:
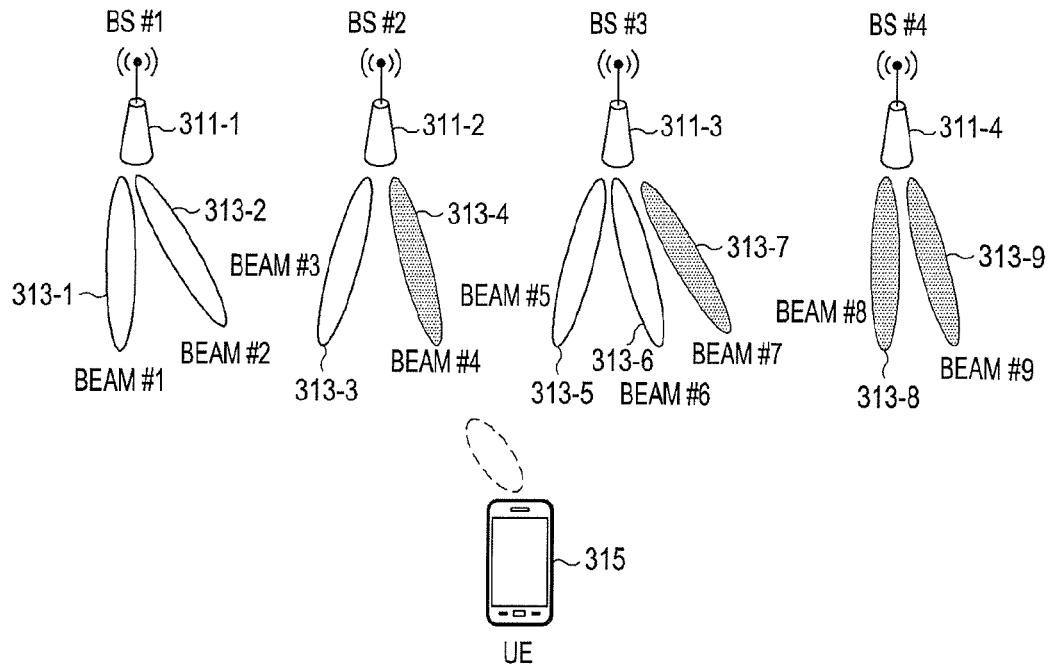
FIG. 3 schematically illustrates a system structure to which a multi-BS beam hopping scheme is applied according to various embodiments of the present disclosure.

FIG. 3 schematically illustrates a transmission beam hopping structure of the multi-cell communication system according to various embodiments of the present disclosure.

The multi-cell communication system includes a plurality of BSs, a plurality of beams, which can be used by the BSs, and a plurality of UEs. In FIG. 3, an example of the multi-cell communication system includes four BSs, that is, BS #1 311-1, BS #2 311-2, BS #3 311-3, and BS #3 311-4, nine transmission beams, that is, beam #1 313-1, beam #2 313-2, . . . , beam #9 313-9, and one UE 315.

According to various embodiments of the present disclosure, a method of using multiple transmission beams by a multi-signal transmitting device includes an operation (hereinafter, referred to as a first operation) for determining available beams by a signal receiving device based on a predetermined reference, an operation (hereinafter, referred to as a second operation) for determining a multi-transmission beam using method, that is, a transmission beam hopping pattern by the signal receiving device, and an operation (hereinafter, referred to as a third operation) for initializing transmission beam hopping. Further, the present disclosure suggests a method of servicing a transmission beam to the signal receiving device at a predetermined time by a signal transmitting device based on a transmission beam hopping method acquired from the signal receiving device and a method of forming a reception beam based on a beam hopping method determined in the second operation by the signal receiving device.

A process for selecting available transmission beams by the UE in a multi-cell communication system according to various embodiments of the present disclosure will be first described with reference to FIGS. 3 and 4.

In FIG. 3, the UE 315 makes a request for allowing multiple accesses for beam hopping for a time T to adjacent BSs. The adjacent BSs determine to allow or not allow the beam hopping operation of the UE 315 according to a service state of the service UEs of the BSs and inform the UE 315 of a result of the determination. FIG. 3 illustrates four adjacent BSs 311-1 to 311-4 that performs multiple accesses for a predetermined time T determined based on a result of the determination on whether the multiple accesses are allowed for the beam hopping by the adjacent BSs.

Figure 4:
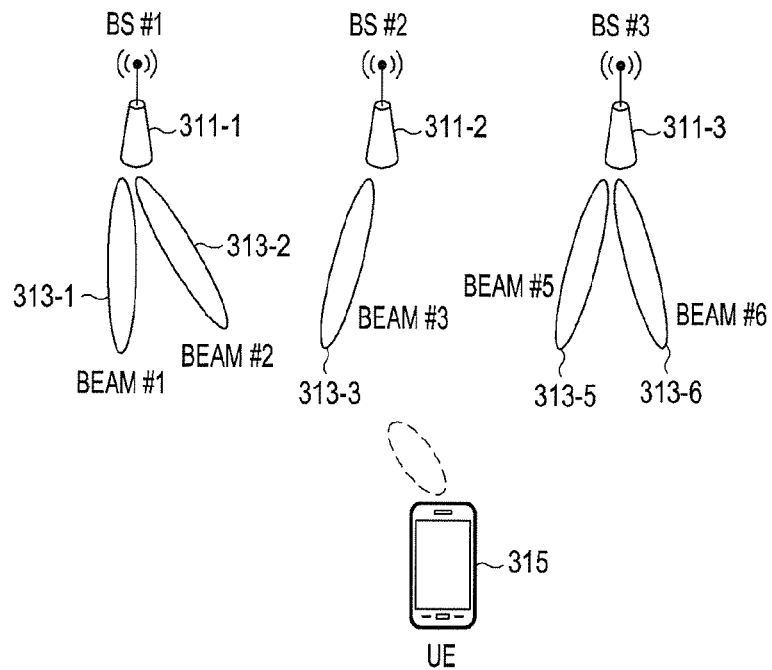
FIG. 4 schematically illustrates an operation in which the UE determines available beams of multi-BS beams according to various embodiments of the present disclosure.

FIG. 4 schematically illustrates the first operation in which the UE determines available beams among the transmission beams of the adjacent BSs enabling the multiple accesses according to various embodiments of the present disclosure.

Referring to FIG. 4, the UE 315 selects only beams above a predetermined reference, for example, beams of 10 dB or larger as available beams among nine transmission beams of the adjacent BSs 311-1 to 311-4 accessible for a time T, that is, beam #1 313-1, beam #2 313-2, . . . , beam #9 313-9 based on a predetermined beam selection reference. The beam selection reference is, for example, a received signal-to-noise ratio. In FIG. 4, it is assumed that five beams of the nine beams, that is, beam #1 313-1, beam #2 313-2, beam #3 313-3, beam #5 313-5, and beam #6 313-6 are selected as available beams. For such an operation, the UE 315 already knows information on the transmission beam selection reference or receives the information from BSs enabling the multiple accesses, that is, BS #1 311-1, BS #2 311-2, and BS #3 311-3 before selecting the transmission beams.

Figures 5, 6:
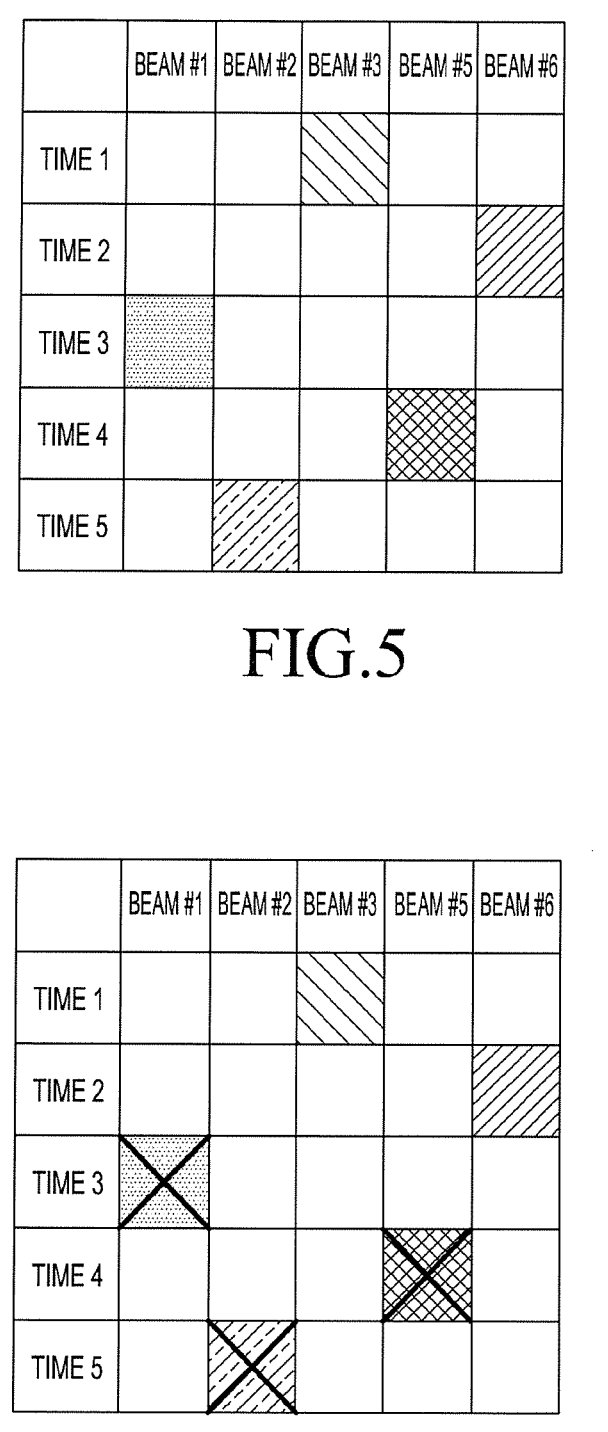

FIG. 5 illustrates the second operation for determining whether beams are used according to the time based on the available beams determined through the first operation of FIG. 4, that is, a beam hopping pattern indicating beam hopping according to various embodiments of the present disclosure.

The beam hopping pattern is determined based on a predetermined beam hopping pattern rule between the BS and the UE. That is, a beam hopping pattern rule optimized for frequency hopping is shared between the BS and the UE, and the UE selects a beam hopping pattern suitable for a current state from beam hopping patterns according to the shared pattern rule and feeds back an index of the selected beam hopping pattern to the BS. The beam pattern rule used herein is not limited to a particular rule, and various rules can be used. In FIG. 5, a hopping pattern using the five beams determined through the first operation for time 1 to time 5 having the same time interval is considered. That is, beam #3 313-3 is used for time 1, beam #6 313-6 is used for time 2, beam #1 313-1 is used for time 3, beam #5 313-5 is used for time 4, and beam #2 313-2 is used for time 5.

FIG. 6 illustrates the third operation in which the UE maintains or initializes the beam hopping pattern determined as illustrated in FIG. 5 according to various embodiments of the present disclosure.

Whether to maintain the beam hopping pattern is determined based on a determination by the UE on whether beams of a predetermined portion or more are excluded from a set of the available beams, and the determination is periodically performed at predetermined time intervals. According to various embodiments of the present disclosure, the UE determines whether beams of 50% or more are excluded from the set of the available beams at a time point after a time point from an operation start time point with respect to total operation time T (time 1 to time 5) and initializes the beam hopping pattern according a result of the determination.

Referring to FIG. 6, in time 3, beam #1 does not meet the available transmission beam reference of the first operation, and thus is excluded from the set of the available beams. However, since four beams (beam #2, beam #3, beam #5, and beam #6) that account for 50% or more of the five beams (beam #1, beam #2, beam #3, beam #5, and beam #6) can be used, the transmission beam hopping pattern is maintained. In time 5, beam #2 and beam #5 are additionally excluded from the set of available beams. In certain embodiments, since only two beams (beam #3 and beam #6) that account for 50% or less of the five beams are included in the set of the available beams, the total beam hopping pattern is initialized and the UE performs the process again from the first operation.

In FIG. 6, although it has been described that, as the reference for determining whether to maintain the beam hopping pattern, the beam hopping pattern is maintained when the portion of the available beams is 50% or more among the initially determined available beams at the time point when it is determined whether to maintain the beam hopping pattern, portion which becomes the reference is appropriately set according to a communication environment. Further, although it has been described in FIG. 6 that the time point when it is determined whether to maintain the beam hopping pattern is the same as the time point when the beam is changed, the present disclosure is not limited thereto and the time point when it is determined whether to maintain the beam hopping pattern is differently configured from the time point when the beam is changed.

Figure 7:
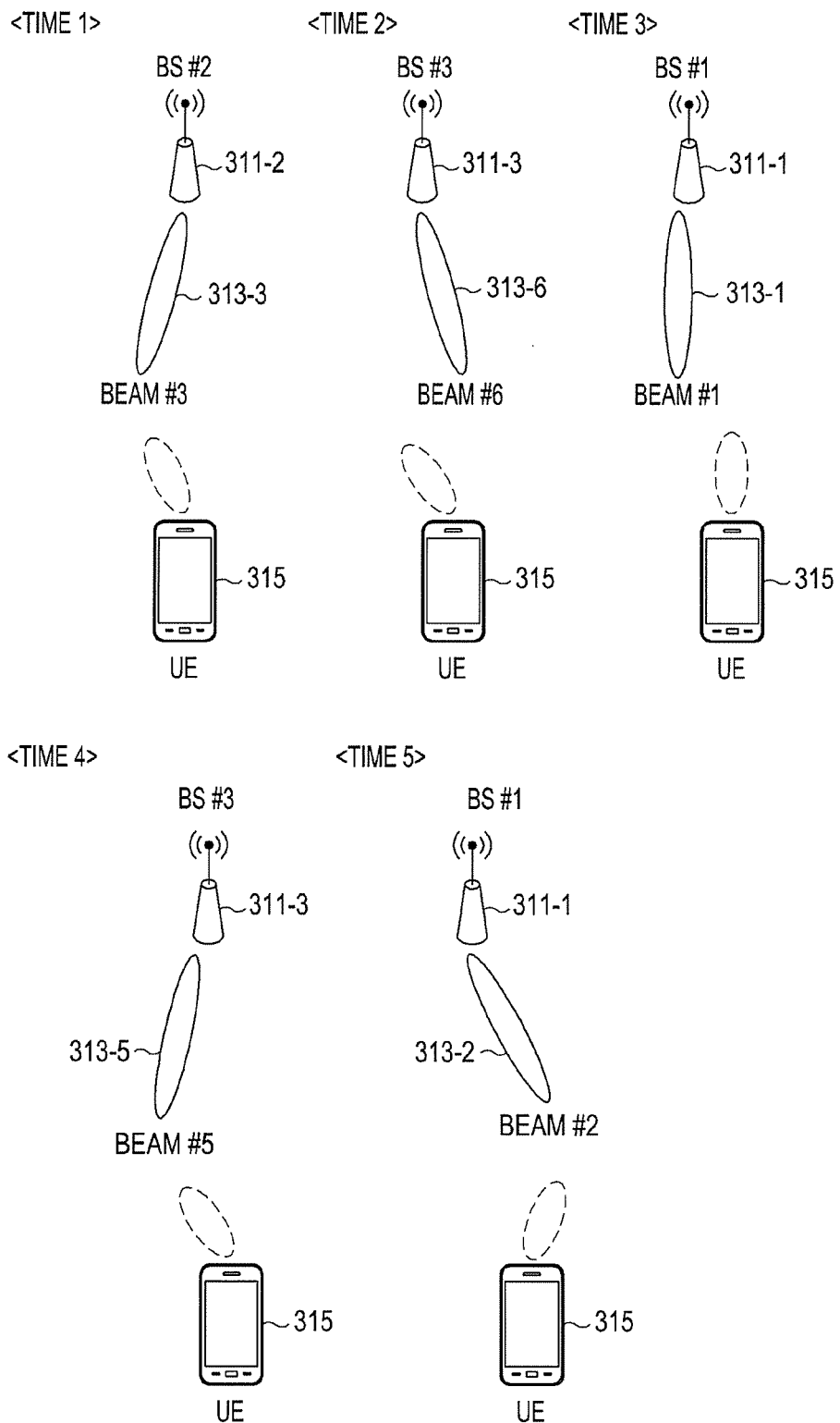
FIG. 7 illustrates an example in which a transmission device transmits a transmission signal based on a multi-BS beam hopping scheme and a reception device forms a reception beam according to various embodiments of the present disclosure.

FIG. 7 illustrates a process in which BSs transmit signals to the UE for a predetermined time based on a beam hopping pattern determined by the UE according to the first operation, the second operation, and the third operation and the UE forms reception beams based the beam hopping pattern and receives signals according to various embodiments of the present disclosure.

When BS #1 311-1, BS # 311-2, and B #3 311-3 receive a beam hopping pattern from the UE 315, the BSs determine directions and forms of transmission beams at the corresponding time according to the beam hopping pattern and transmit signals through the determined transmission beams. The UE 315 determines directions and the form of reception beams at the corresponding time based on the determined beam hopping pattern according to the first operation, the second operation, and the third operation and receives the signals. Further, the UE 315 periodically determines whether a new beam hopping pattern is used based on the first operation, the second operation, and the third operation, maintains or initializes the beam hopping pattern, and informs BS #1 311-1, BS #2 311-2, and BS #3 311-3 of a result thereof.

Referring to FIG. 7, BS #1 311-1, BS #2 311-2, and BS #3 311-3 receive the beam hopping pattern of FIG. 5 from the UE 315, BS #2 311-2 transmits beam #3 for time 1, BS #3 311-3 transmits beam #6 for time 2, BS #1 311-1 transmits beam #1 for time 3, BS #3 311-3 transmits beam #5 for time 4, and BS #1 311-1 transmits beam #2 for time 5 according to the beam hopping pattern. The UE 315 receives beam #3 of BS #2 311-2 for time 1, beam #6 of BS #3 311-3 for time 2, beam # 1 of BS #1 311-1 for time 3, beam #5 of BS #3 311-3 for time 4, and beam #2 of BS #1 311-1 for time 5 according to the beam hopping pattern. In FIG. 7, although it is assumed that the beam hopping pattern of FIG. 5 is maintained for the total operation time T (that is, time 1 to time 5) without initialization, when the beam hopping pattern is initialized in time 5 as illustrated in FIG. 6, the corresponding BS transmits the corresponding beam based on the changed beam hopping pattern and the UE determines the direction and form of a reception beam according to the changed beam hopping pattern and receives the corresponding beam.

Figure 8:
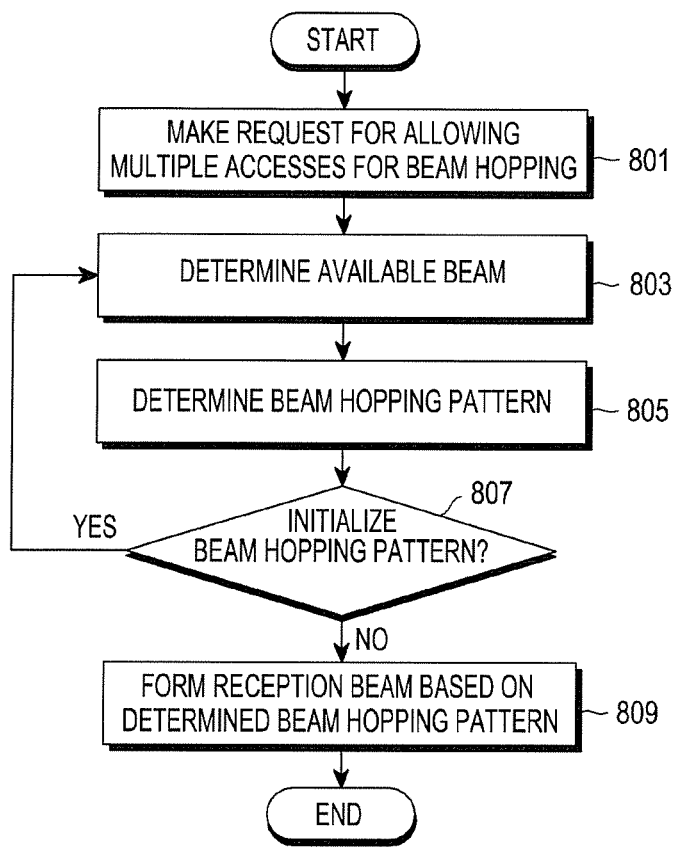
FIG. 8 is a flowchart illustrating an operation of the UE in a multi-cell communication system according to various embodiments of the present disclosure.

FIG. 8 is a flowchart illustrating an operation of the UE in the multi-cell communication system according to various embodiments of the present disclosure.

Referring to FIG. 8, the UE makes a request for allowing multiple accesses for beam hopping for a time T to adjacent BSs in operation 801. The adjacent BSs determine to allow or not allow the beam hopping operation of the UE according to a service state of the service UEs of the BSs and inform the UE of a result of the determination. Then, in operation 803, the UE determines beams which can be used by allowable BSs according to information on whether the beam hopping operation is allowed, which is received from the BSs. As described above, the UE determines a beam hopping pattern based on a predetermined beam hopping pattern rule between the BS and the UE and transmits the determined beam hopping pattern to the BS in operation 805. Further, the UE determines whether to maintain the beam hopping pattern periodically at predetermined time intervals in operation 807. When it is determined to initialize the beam hopping pattern, the UE returns to step 803 and determines available beams again. When it is determined to maintain the beam hopping pattern, the UE forms reception beams based on the determined hopping pattern and receives signals from the BSs in operation 809.

Figure 9:
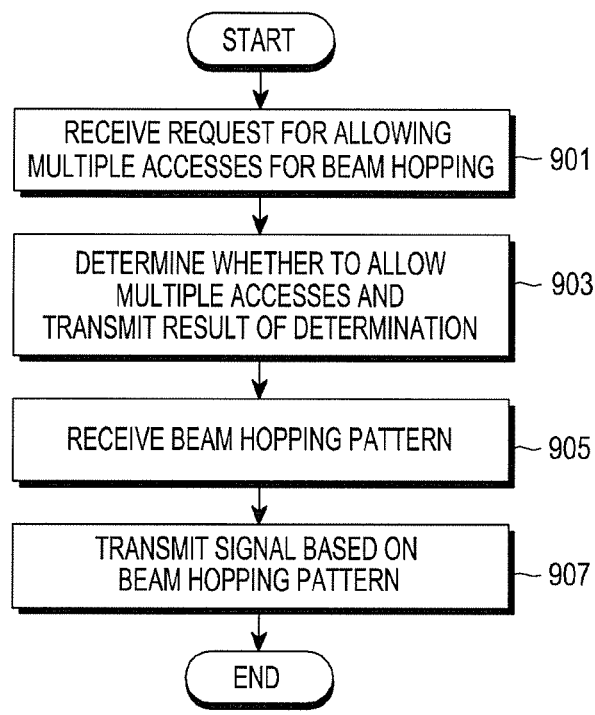
FIG. 9 is a flowchart schematically illustrating an operation of the BS in a multi-cell communication system according to various embodiments of the present disclosure.

FIG. 9 is a flowchart schematically illustrating an operation of the BS in the multi-cell communication system according to various embodiments of the present disclosure.

Referring to FIG. 9, the BS receives a request for allowing multiple accesses for beam hopping from the UE in operation 901, and determines whether to allow or not allow the beam hopping operation of the UE according to a service state of the service UEs of the BS and informs the UE of a result of the determination in operation 903. Thereafter, when the BS receives a beam hopping pattern from the UE in operation 905, the BS determines the direction and form of the transmission beam based on the received beam hopping pattern and transmits the signal through the determined transmission beam in operation 907.

Figure 10:
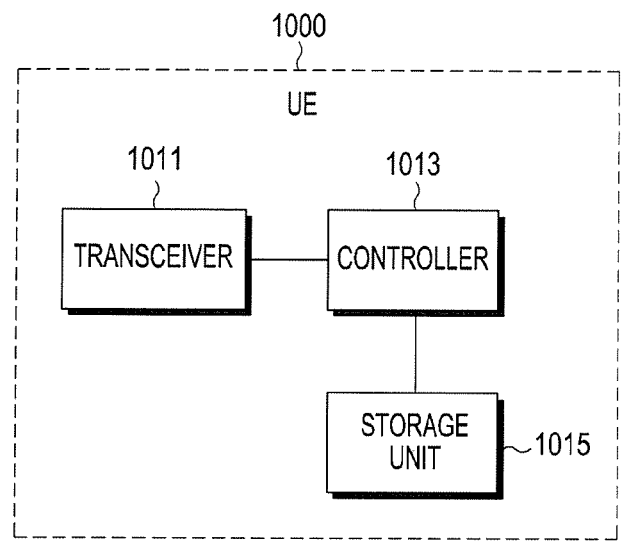
FIG. 10 schematically illustrates a configuration of the UE in a multi-cell communication system according to various embodiments of the present disclosure.

FIG. 10 schematically illustrates an internal structure of the UE in the multi-cell communication system according to various embodiments of the present disclosure.

Referring to FIG. 10, a UE 1000 includes a transceiver 1011, a controller 1013, and a storage unit 1015. The controller 1013 controls the general operation of the UE 1000 and, particularly, controls an operation related to an interference control in the multi-cell communication system as illustrated in FIGS. 7 and 8. Since the operation process of the UE according to the beam hopping in the multi-cell communication system has been described in FIGS. 4 to 8, a detailed description thereof will be omitted herein. The transceiver 1011 transmits/receives various signals and messages related to a beam hopping operation and a reception beam forming operation according to the beam hopping operation in the multi-cell communication system as described in FIGS. 4 to 8 under a control of the controller 1013. The storage unit 1015 stores a determined beam hopping pattern under a control of the controller 1013.

Figure 11:
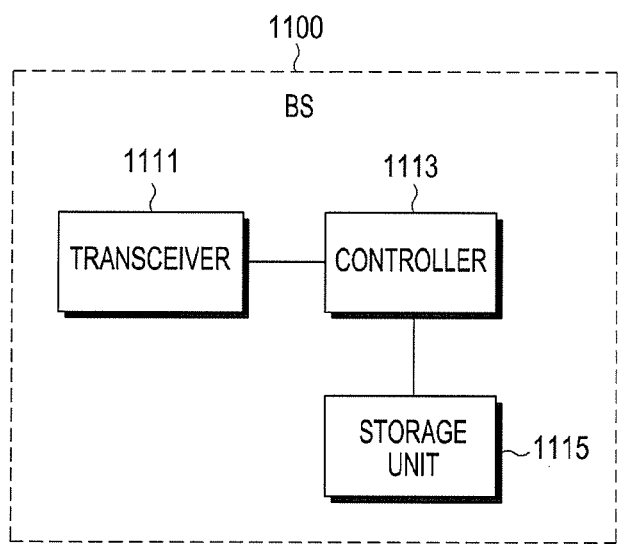
FIG. 11 schematically illustrates a configuration of the BS in a multi-cell communication system according to various embodiments of the present disclosure.

FIG. 11 schematically illustrates an internal structure of the BS in the multi-cell communication system according to various embodiments of the present disclosure.

Referring to FIG. 11, a BS 1100 includes a transceiver 1111, a controller 1113, and a storage unit 1115. The controller 1113 controls the general operation of the BS 1100 and, particularly, controls an operation related to a beam interference control in the multi-cell communication system as illustrated in FIG. 7. Since the beam transmission process of the BS according to the beam hopping in the multi-cell communication system has been described in FIGS. 7 and 9, a detailed description thereof will be omitted herein. The transceiver 1111 transmits/receives, to/from the UE, various signals and messages related to a beam hopping operation and a signal transmission/reception operation according to the beam hopping operation in the multi-cell communication system as described in FIG. 7 under a control of the controller 1113. The storage unit 1115 stores a beam hopping pattern received from the UE under a control of the controller 1113.

Those skilled in the art can appreciate that it is possible to implement the present disclosure in another specific form without changing the technical idea or the indispensable characteristics of the present disclosure. Accordingly, it should be understood that the embodiments described above are merely exemplary and are not limited.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of performing adaptive beam hopping by a user equipment (UE) in a multi-cell multi-user communication system, the method comprising:
   transmitting a request for allowing multiple accesses for beam hopping for a predetermined operation time to a plurality of accessible base stations (BSs);
   receiving a response to the request from two or more BSs among the plurality of BSs and determining, based on a reference, beams above the reference among transmission beams of the two or more BSs as available beams;
   determining a beam hopping pattern based on the determined available beams and transmitting the determined hopping pattern to the two or more BSs; and
   receiving a signal by forming reception beams based on the determined beam hopping pattern.

2. The method of claim 1, wherein the reference is predetermined based on an appointment with the BS or received from the BS.

3. The method of claim 1, wherein the determining of the beam hopping pattern comprises dividing the operation time into predetermined time intervals and determining a transmission beam which is used at each of the divided time intervals.

4. The method of claim 1, further comprising:
   determining whether to maintain the beam hopping pattern periodically for the operation time, and, if it is determined that the beam hopping pattern cannot be maintained, returning to the determining of the available beams.

5. The method of claim 4, wherein whether to maintain the beam hopping pattern is determined based on a percentage of available beams at a time point if it is determined whether to maintain the beam hopping pattern for the determined available beams.

6. The method of claim 1, wherein the reference is a received signal-to-noise ratio.

7. A method of performing adaptive beam hopping by a base station (BS) in a multi-cell multi-user communication system, the method comprising:
   receiving a request for allowing multiple accesses for beam hopping for a predetermined operation time from a user equipment (UE);

determining whether to allow the multiple accesses of the UE and transmitting a result of the determination to the UE;

receiving a beam hopping pattern from the UE; and forming a transmission beam based on the received beam hopping pattern and transmitting a signal.

8. The method of claim 7, wherein the determining of whether to allow the multiple accesses of the UE comprises determining whether to allow the multiple accesses of the UE based on service states of UEs to which the BS provides a service.

9. The method of claim 7, further comprising transmitting reference information for selecting an available transmission beam to the UE.

10. The method of claim 7, wherein the beam hopping pattern indicates transmission beams determined based on each of predetermined time intervals into which the operation time is divided.

11. An apparatus for performing adaptive beam hopping in a multi-cell multi-user communication system, the apparatus comprising:

a transceiver configured to transmit and receive a signal to and from one or more base stations (BSs); and a controller configured to:

make a request for allowing multiple accesses for beam hoping for a predetermined operation time to a plurality of accessible BSs, receive a response to the request from two or more of the plurality of BSs, determine, as available beams, beams exceeding a reference among transmission beams of the two or more BSs based on a predetermined reference, determine a beam hopping pattern based on the determined available beams, transmit the determined beam hopping pattern to the two or more BSs, and form a reception beam based on the determined beam hopping pattern to receive a signal.

12. The apparatus of claim 11, wherein the predetermined reference is predetermined based on an appointment with the BS or received from the BS.

13. The apparatus of claim 11, wherein the controller is further configured to:

divide the operation time into predetermined time intervals, and determines transmission beams used at each of the divided time intervals.

14. The apparatus of claim 11, wherein the controller is further configured to: determine whether to maintain the beam hopping pattern periodically for the operation time and, if it is determined that the beam hopping pattern cannot be maintained, re-determine the available beams.

15. The apparatus of claim 14, wherein the controller is further configured to determine whether to maintain the beam hopping pattern based on the percentage of available beams at a time point if it is determined whether to maintain the beam hopping pattern for the determined available beams.

16. The apparatus of claim 11, wherein the reference is a received signal-to-noise ratio.

17. An apparatus for performing adaptive beam hopping in a multi-cell multi-user communication system, the apparatus comprising:

a transceiver configured to transmit and receive signals to and from a plurality of user equipments (UEs); and a controller configured to:

receive a request for allowing multiples accesses for beam hopping for a predetermined operation time from the UE, determine whether to allow the multiple accesses of the UE, to transmit a result of the determination to the UE, receive a beam hopping pattern from the UE, and form a transmission beam based on the received beam hopping pattern to transmit a signal.

18. The apparatus of claim 17, wherein the controller is further configured to determine whether to allow the multiple accesses of the UE based on service states of UEs to which the BS provides a service.

19. The apparatus of claim 17, wherein the controller is further configured to transmit reference information for selecting an available transmission beam to the UE.

20. The apparatus of claim 17, wherein the beam hopping pattern indicates transmission beams determined based on predetermined time intervals into which the operation time is divided.

* * * * *